(12) United States Patent
Cardona et al.

(10) Patent No.: US 8,442,553 B2
(45) Date of Patent: May 14, 2013

(54) SYSTEM AND METHOD FOR DETERMINING LOCATION OF A WI-FI DEVICE WITH THE ASSISTANCE OF FIXED RECEIVERS

(75) Inventors: Javier Cardona, San Francisco, CA (US); Frédéric Lassabe, Belfort (FR); Alejandro Herrera, Barcelona (ES)

(73) Assignee: Cozybit Inc., San Francisco, CA (US)

( * ) Notice: Subject to any disclaimer, the term of this patent is extended or adjusted under 35 U.S.C. 154(b) by 185 days.

(21) Appl. No.: 13/069,219

(22) Filed: Mar. 22, 2011

(65) Prior Publication Data

US 2012/0244875 A1 Sep. 27, 2012

(51) Int. Cl.
*H04W 24/00* (2009.01)
(52) U.S. Cl.
USPC .................... 455/456.1; 342/357.43
(58) Field of Classification Search ............... 455/456.1, 455/556.1, 41.2; 370/338; 342/451, 450; 705/14.58
See application file for complete search history.

(56) References Cited

U.S. PATENT DOCUMENTS

2011/0316748 A1* 12/2011 Meyer et al. .................. 342/451

* cited by examiner

*Primary Examiner* — Phuoc Doan
(74) *Attorney, Agent, or Firm* — Blakely, Sokoloff, Taylor & Zafman LLP (57) ABSTRACT

A method and apparatus is disclosed herein for determining the location of a device with the assistance of fixed receivers. In one embodiment, the method comprises receiving a first request from the mobile device in the wireless network; wirelessly transmitting one or more positioning requests in response to the first request; receiving signal strength information from one or more receivers in the wireless network sent in response to the one or more positioning requests; determining a location of the mobile device based on received signal strength information by comparing the received signal strength information with signal strength information of reference locations; and sending location information to the mobile device, where the location information is indicative of the location of the mobile device.

26 Claims, 5 Drawing Sheets

SYSTEM AND METHOD FOR DETERMINING LOCATION OF A WI-FI DEVICE WITH THE ASSISTANCE OF FIXED RECEIVERS

FIELD OF THE INVENTION

Embodiments of the present invention relates to the field of wireless networks; more particularly, embodiments of the present invention relate to detecting the location of a mobile device in a wireless network using receivers in the wireless network at fixed locations.

BACKGROUND OF THE INVENTION

A number of Wi-Fi-based indoor positioning systems exist in the prior art. These systems are usually classified into three categories: propagation-based systems; signal strength map-based systems; and hybrid systems. For more information, see F. Lassabe, Geolocalisation et prediction dans les reseaux Wi-Fi en interieur, Phd thesis, LIFC, University of Franche-Comte, France, Apr. 21, 2009.

There are two types of signal strength map-based positioning systems: deterministic systems and probabilistic systems. The deterministic system approach relies on an average signal strength map database. To locate a mobile device (M), database content and real-time measurements are compared. Positioning systems in this family require physical coordinates and average signal strength (SS) values. For every physical coordinate in such a system, SS measurements of transmissions by a mobile device at the given physical location are taken at every system waypoint (YP). Typically, not all YPs will detect the transmitted signal, and at those YPs, the recorded SS will be zero.

A location record has the following form: $(p, ss_1, \ldots, ss_N)$ where p are coordinates and $(ss_1, \ldots, ss_N)$ are signal strength measurements. The database may include additional application-specific data (in separate records), such as signal quality (data rate, errors, etc.). For example, in RADAR systems, mobile orientation is stored along with coordinates and signal strength measurements. For more information, see Paramvir Bahl and Venkata N. Padmanabhan, "RADAR: An in-building RF-based user location and tracking system", In *INFOCOM* (2), 2000, pages 775-784.

Some systems disambiguate between points based on past locations. They use a Viterbi-like algorithm to give greater weight to points closer to the last known location. They also account for factors that affect signal strength in known ways by using signal strength measurement profiles based on a variety of criteria. For example, signal strength measurements vary based on crowd density, which can often be predicted based on the time of day.

Using the closest point in signal strength space without further refinement is one proposed algorithm. In an improvement to that system, several points in the database are selected (the closest ones from the measurement transmitted) and the weighted average location is computed as follows:

$$p = \frac{\sum_{j=1}^{k} \frac{1}{d(ss_{ij}; ss) + \varepsilon} p_{ij}}{\sum_{j=1}^{k} \frac{1}{d(ss_{ij}; ss) + \varepsilon}}$$

where $d(ss_{ij}; ss)$ is signal strength space Euclidean distance between database measurements $ss_1$ and current measurement ss and $\varepsilon$ is a very small constant used to avoid divide by zero errors.

Probabilistic systems are based on signal strength measurement sets for each location in the signal strength database. Using large data sets can lead to high computational loads. Solutions have been proposed to address this problem. Two algorithms are exposed—joint clustering and incremental triangulation—to cluster data and reduce the search space (lessen the number of records to evaluate) used to locate a mobile device, which reduces the computational time. Other systems use Bayesian inference to locate mobile devices in rooms and based on signal strength discretized histograms.

Thus, there are a number of algorithms in the literature that estimate a device's position based on information from radio signal strength maps. (Such algorithms are known as signal strength cartography or RF signature). The signal strength measurements required to compute the RF signature can be obtained from either the mobile device to be located or from the infrastructure around mobile device. Both approaches have their shortcomings.

Measuring signal strength on the mobile device requires low level access to the wireless hardware. But mobile device software applications frequently are denied such access. Moreover, relying on mobile devices themselves to provide their signal strength measurements raises some problems about hardware and software heterogeneity, which is why existing solutions that implement this approach require custom hardware (asset tracking tags).

In order to obtain signal strength information from the 802.11 infrastructure, the APs within range of the mobile devices requires customizing the APs in a way that commercial infrastructure providers do not allow. Existing solutions that implement this approach can be developed only by 802.11 vendors, and all such solutions work exclusively on the infrastructure provided by the vendor.

SUMMARY OF THE INVENTION

A method and apparatus is disclosed herein for determining the location of a device with the assistance of fixed receivers. In one embodiment, the method comprises receiving a first request from the mobile device in the wireless network; wirelessly transmitting one or more positioning requests in response to the first request; receiving signal strength information from one or more receivers in the wireless network sent in response to the one or more positioning requests; determining a location of the mobile device based on received signal strength information by comparing the received signal strength information with signal strength information of reference locations; and sending location information to the mobile device, where the location information is indicative of the location of the mobile device.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A positioning system described herein determines the position of a mobile device (M) inside a building or other structure. In one embodiment, these building and other structures are those where GPS will not work. In one embodiment, the positioning system is designed to enable the mobile device (M) to obtain an estimate of its position with the assistance of external receivers. In one embodiment, these external receivers are waypoints.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

In one embodiment, the positioning system (hereafter referred to herein as "the system") comprises the following types of entities: a mobile device (M), a map server (MS), an access point (AP), and a waypoint (YP).

The mobile device (M) is a station or device to be located. In one embodiment, the mobile device is a smartphone; however, the mobile device may be any mobile client, terminal, tablet, etc. In one embodiment, the mobile device communicates with the map server only over the HTTP protocol.

In one embodiment, the map server (MS) configures waypoints, collects signal strength information, computes the location of the mobile device, and generates a map or other information indicative of the location of the mobile device.

In one embodiment, the access point (AP) comprises an 802.11 access point that provides standard Wi-Fi service. Importantly, in one embodiment, the location determination process does not require any changes to the AP.

In one embodiment, waypoints (YP) are stationary devices associated with the same Wi-Fi network as the system's mobile devices (Ms). In one embodiment, waypoints operate in promiscuous modes when necessary (such as while calculating the position of the mobile device (M)) but not constantly (so that they can operate in IEEE Power Save mode), and while in promiscuous mode, waypoints can maintain an association with an access point and can therefore capture traffic not directly addressed to them while still being part of the IEEE 802.11 Basic Service Set. This allows waypoints to communicate at layer 3 with the map server while capturing layer 2 frames with information from the physical layer (e.g., signal strength, signaling rate, which antenna was used for reception, etc.) from other nodes. In one embodiment, the captured traffic is encrypted, and the waypoints are not able to analyze the payload of encrypted frames. When system operates in a wireless network in which communications adhere to 802.11, the fact that the traffic is encrypted does not constrain system performance because only the signal strength and MAC addresses (which per 802.11 design cannot be encrypted) are used to determine the location of the mobile device.

In one embodiment, a location determination client (LDC) is software that runs on a mobile device in the system to help a mobile device obtain information indicative of its position. In one embodiment, the techniques employed in the system reduce, and potentially minimize, the complexity of the LDC so that any standard mobile device (M) can implement the client side of the protocol. In one embodiment, the LDC can run inside any HTTP browser and does not require low-level programming on the mobile device (M) side.

Figure 1A:
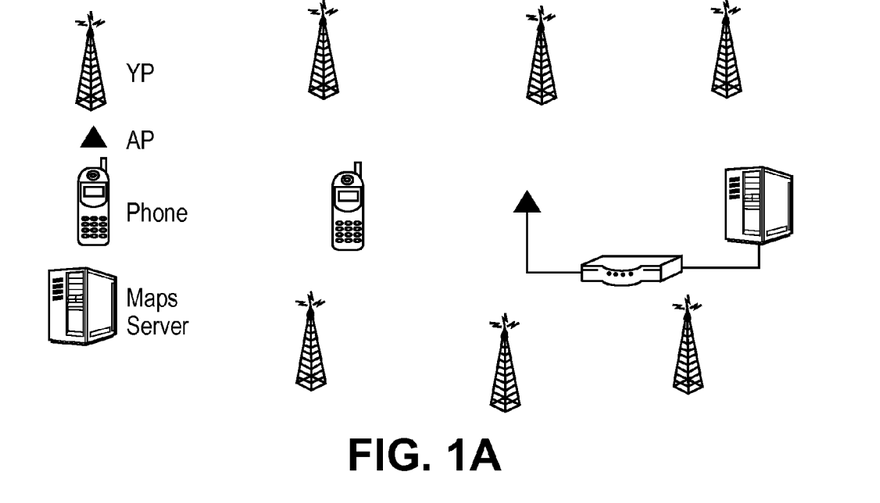
FIG. 1A is a block diagram of one embodiment of the system.

FIG. 1A is a block diagram of one embodiment of the system. The system operates as part of a wireless communication network. Referring to FIG. 1A, the system comprises a mobile device 101, a map server 102, a number of waypoints 103 located in the vicinity of mobile device 101 to be located and one or more access points 104, all connected to the same local network and each one running software programs that cooperate to determine the location of mobile device 101.

In one embodiment, mobile device 101 communicates with MS 102 using the HTTP protocol. In such a case, mobile device 101 includes an HTTP client, and all communications to and from the software running on mobile device 101 occur at layer 4 using the HTTP protocol. In one embodiment, map server 102 communicates with the YPs 103 over a network (e.g., an IP network) and uses information from the YP lower layers (such as, for example, received signal strength, MAC addresses of YPs, and information about the access point (e.g., base station) to determine the location of mobile device 101. That is, one embodiment of the system described herein overcomes limitations described above by using dedicated hardware (e.g., waypoints) that collect and report radio layer information back to map server 102.

In one embodiment, waypoints 103 operate simultaneously as standard 802.11 stations and layer 2 frame monitor devices (sniffers). This dual functionality enables a waypoint to simultaneously be a part of the network—that is, capable of communicating with other devices in the network at layer 2 and above—while at the same time collecting information about the network's physical layer (e.g., signal strength measurements of the mobile device's transmissions). Thus, one embodiment of the system described herein is vendor-neutral in the sense that waypoints can be integrated into any 802.11 compliant network and do not require privileged system access to either the access point or the mobile device.

In one embodiment, mobile device 101 executes a location determination client, which is a software program executed on mobile device 101 that communicates with map server 102. Waypoints 103 in the vicinity of mobile device 101 monitor communications of the mobile device 101 to map server communications and gather signal strength information that, when combined with data stored on map server 102, is used to estimate the position of mobile device 101.

More specifically, in one embodiment, map server 102 generates one or more position requests in response to a request from mobile device 101 that requests map server 102 to provide its location. At least one access point is communicably coupled to map server 102 and sends the position requests out to the wireless network. Waypoints 103, acting as receivers, are at fixed locations and receive the position requests. As discussed above, in one embodiment, waypoints 103 operate simultaneously as a wireless station in the wireless network and as a sniffer in the wireless network. In response to the position requests from map server 102, each waypoint 103 wireless transmits signal strength information for mobile device 101. The signal strength information is obtained by monitoring mobile device communications in the wireless network and taking signal strength measurements of those communications. Using this information, map server 102 determines the location of the mobile device based on a comparison between signal strength information received from one or more waypoints 103 and signal strength information from reference points within the wireless network.

Figure 1B:
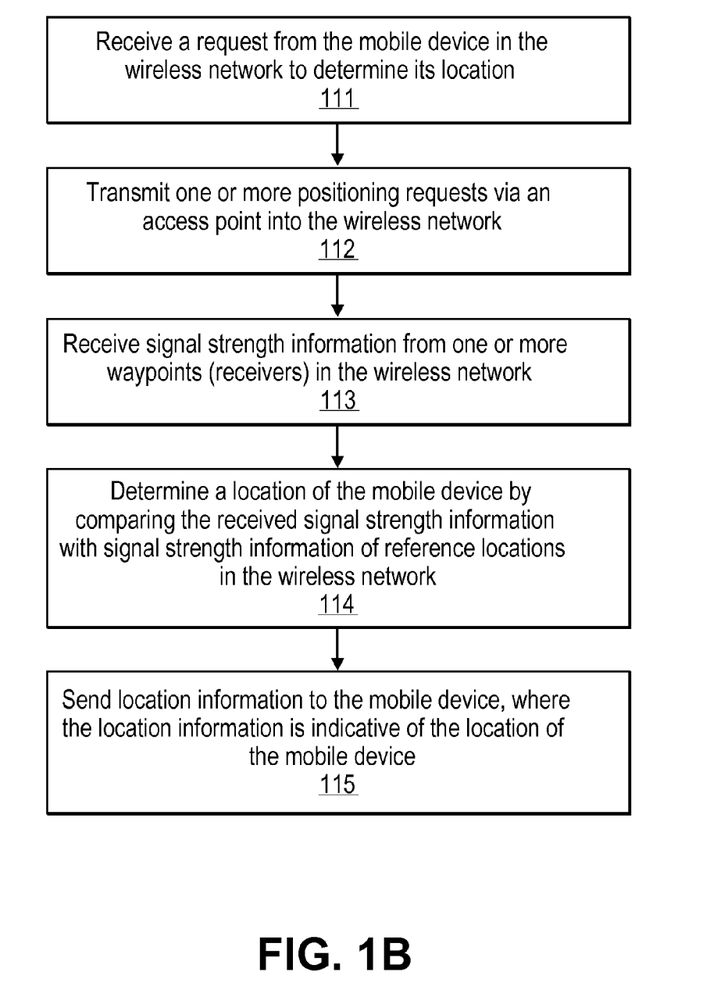
FIG. 1B is a flow diagram of one embodiment of the process performed by the map server to determine the location of a mobile device.

FIG. 1B is a flow diagram of one embodiment of the process performed by the map server to determine the location of a mobile device. The process is performed by processing logic that may comprises hardware (e.g., circuitry, dedicated logic, etc.), software (such as is run on a general purpose computer system or dedicated machine), or a combination of both.

Referring to FIG. 1B, the process begins by processing logic in the map server receiving a request from the mobile device in the wireless network to determine its location (processing block 111). In one embodiment, the request from the mobile device includes the MAC address of the mobile device. In one embodiment, the request from the mobile device includes information indicating a channel the mobile device is using for transmission to the map server. In one embodiment, the request from the mobile device is received communication over the HTTP protocol. In one embodiment, the mobile device is a Wi-Fi device (e.g., an IEEE 802.11 device).

In response to the request, processing logic wirelessly transmits one or more positioning requests via an access point into the wireless network (processing block 112). In one embodiment, the request from the mobile device and the positioning requests are layer 3 requests.

In response to the positioning requests, processing logic receives signal strength information from one or more waypoints (receivers) in the wireless network (processing block 113). In one embodiment, the received signal strength information is from the one or more waypoints sniffing wireless channels in the wireless network. In one embodiment, at least one waypoint sniffs multiple channels. In one embodiment, each of the waypoints sends the signal strength information via a HTTP POST operation.

Using the signal strength information, processing logic in the map server determines a location of the mobile device by comparing the received signal strength information with signal strength information of reference locations in the wireless network (processing block 114). In one embodiment, the map server determines the location of the mobile device by identifying a closest reference point based on a comparison of the received signal strength information to the signal strength information of the one or more fixed receivers, and identifying a location based on a relationship between the received signal strength information and signal strength information of the closest reference point.

In one embodiment, the signal strength information of the reference points is based on mobile device transmissions from known locations identified by GPS coordinates. In another embodiment, the signal strength information of reference points are based on mobile device transmissions from known locations identified by the mobile device scanning in machine readable information at the known locations.

After determining the mobile device's location, processing logic in the map server sends location information to the mobile device, where the location information is indicative of the location of the mobile device (processing block 115). In one embodiment, the information sent to the mobile device comprises map data that provides a graphical indication of mobile device location when displayed.

An Example of a Protocol

The following description sets forth one embodiment of a FIND_ME protocol used to locate a mobile device. A number of example algorithms for each entity in the positioning system are described. Furthermore, problems that can occur and propose solutions to those problems are also discussed.

System Entities and their Algorithms

In the following description, communication protocols (or algorithms) that are used in one embodiment of the mobile device and waypoint algorithms are disclosed.

An Example of a Mobile Terminal

In one embodiment, the mobile device subsystem does not require any hardware modifications to be located, and there is no need for complex software either as the mobile device side of the algorithms comprises simple HTTP requests to the map server, which trigger the location determination process.

In one embodiment, the mobile device performs 3 tasks in sequence: initiation, measurement and result. These are as follows:

1) initiation: send a find request (HTTP FIND_ME message) to the MS (http://SERVER IP:PORT/find me).

2) measurement: generate periodic FIND_ME retries (which will ensure that a minimum amount of traffic for location determination is transmitted). Note that in addition to the FIND_ME retries there may be other traffic generated by the mobile device whose signal strength will also be collected by YPs. This additional traffic will not degrade system performance. On the contrary, collecting additional transmission "samples" provides improved signal strength measurements, leading to greater location determination accuracy.

3) result: once the map server has successfully determined the location of the mobile device (M), the FIND_ME request returns a map from the server. (The format of this map has not been described to avoid obscuring the present invention.)

In one embodiment, the messages issued during the three mobile device tasks are identical: HTTP FIND_ME requests. However, the responses will be different. During initiation, the map server returns STARTING. Then, during the measurement phase, the map server returns TRY_AGAIN. Finally, a response of ERROR or MAP indicates the transition into the result phase.

An Example of a Waypoint

A YP's role is to listen to radio signals and start recording signal strength values for mobile devices in response to a FIND_IT request broadcast by the map server. When a YP receives a FIND_IT message, it first searches its FIND_IT request list. If it finds the corresponding mobile device MAC address, the YP analyzes layer 1 and 2 data in future messages that the mobile device sends to the AP. (Those messages will be frames with the FromDS 802.11 bit unset (i.e. set to 0) in the header's Frame Control Field [IEEE. IEEE Std 802.11™. 2007], and the source address set to the monitored address). This data gathering is performed during a preconfigured time period. Signal strength data is reported back to the mobile device.

The following operations are performed by a waypoint in one embodiment of the location determination process:

1. A mobile device starts issuing FIND_ME requests to the map server.

2. After each FIND_ME request, the map server broadcasts a FIND_IT query that includes the MAC address of the mobile device.

3. A waypoint, upon receipt of a FIND_IT query at layer 3 for a particular mobile device, tries to locate the mobile device MAC address in a table of monitored devices (e.g., a MONITORED_DEVICES_TABLE). If the MAC address is not in the MONITORED_DEVICES_TABLE, then the YP adds it. (In one embodiment, the entry expires after MONITOR_TIMEOUT seconds, at which time it is deleted from the table.) If there is a hit (e.g., the MAC address is found in the table), then the YP obtains the radio layer information from the MONITORED_DEVICES_TABLE for that MAC address, assembles a GOTCHA response that contains the radio layer information and the BSSID or the mobile device, and sends the response to the map server.

4. A waypoint, upon receipt of Layer 2 frame, tries to find the frame's transmitter address (TA) in the MONITORED_DEVICES_TABLE. If the frame's TA is not found in the table, the frame is discarded. If there is a hit (e.g., the TA is found in the table), the YP extracts that frame's radio information from the table and the BSSID. (This information includes at a minimum the received signal strength and the data rate.)

5. The map server collects signal strength information from all the GOTCHA messages it received.

6. The mobile device issues a MAP_ME request to the MS, which responds by returning a map and a position.

The operations of one embodiment of a waypoint are described below.

---

Algorithm 1 YP operations

```
while true do
    if receive(FIND_IT) then
        extract(client_mac; src_ip)
        if src_mac ∈ MONITORED_DEVICES_TABLE then
            if exists_ss_info(src_mac) then
                avg_ss ←
                avg(MONITORED_DEVICES_TABLE[src_mac])
                send_gotcha(client_mac;
                yp_mac; MONITORED_DEV ICES_TA-
                BLE[src_mac].size( ), avg_ss)
            end if
        else
            MONITORED_DEVICES_TABLE.add(src_mac, src_ip,
            MONITOR_TIMEOUT)
        end if
    end if
    if receive(frame) then
        if FromDS = 0 then
            extract(src_mac, ss)
            if src_mac ∈ MONITORED_DEVICES_TABLE then
                MONITORED_DEVICES_TABLE[src_mac].add_ss(ss)
            end if
        end if
    end if
    if ∃ timer_i = 0 ∈ MONITORED_DEVICES_TABLE then
        for all MONITORED_DEVICES_TABLE[i] such that
        MONITORED_DEVICES_TABLE[i].timer = 0 do
            delete(MONITORED_DEVICES_TABLE[i])
        end for
    end if
end while
```

---

In one embodiment, a YP operates according to the following rules:

1) It listens for incoming requests. When a FIND_IT message is received, the YP searches the MONITORED_DEVICES_TABLE for the mobile device (M) MAC address. In the MONITORED_DEVICES_TABLE, each element is composed of a client IP address and a timer. If the MAC address is found in the table and any new message comes from that MAC address, the YP retrieves the layer 2 data and builds a GOTCHA message containing its own MAC address and the signal strength measurement received in the mobile device (M) message. (If the MAC address is not found in the MONITORED_DEVICES_TABLE, it is added. The GOTCHA message is sent to the MS through its IP address (in the network layer). If the mobile device is not in the table, it's added. When a timer expires (e.g., the timer decrements to 0), the entry in the MONITORED_DEVICES_TABLE is deleted.

2) It receives frames and evaluates the corresponding FromDS field value. If it equals 0, the message comes directly from the mobile device. Therefore its signal strength is relevant and of interest to the system. If the value is non-zero, the frame comes from an AP; therefore, the frame is irrelevant, and so is dropped.

3) After a timeout, the MAC address of the mobile device is deleted from the MONITORED_DEVICES_TABLE. If it was the only entry (i.e., the table is now empty), the waypoint leaves promiscuous mode.

The functions (ordered here as they appear in Algorithm 1) are:

receive—determines what type of message is received. If it is a FIND_IT message or frame, the message is processed; otherwise it is ignored.

extract—extracts system-required data (MAC and signal strength) from a FIND_IT message or from a frame.

exists_ss_info—determines whether RF data is available for the given MAC address.

avg—computes the average value of the signal strength (SS) values collected for that MAC address.

send gotcha—builds and sends a GOTCHA message to the map server.

add—adds a new record to the MONITORED_DEVICES_TABLE and initializes its expiration timer.

add_ss—adds a signal strength value to the monitored devices table entry corresponding to MAC address. It is added to the list used to compute the average value when a new FIND_IT request is received.

delete—deletes a record from the MONITORED_DEVICES_TABLE. (The amount of time a mobile device is monitored is determined by its timeout value.)

Because the map server needs to know of all the YPs in the system, when a YP powers on, it registers with the map server by sending a REGISTER message.

Figure 2:
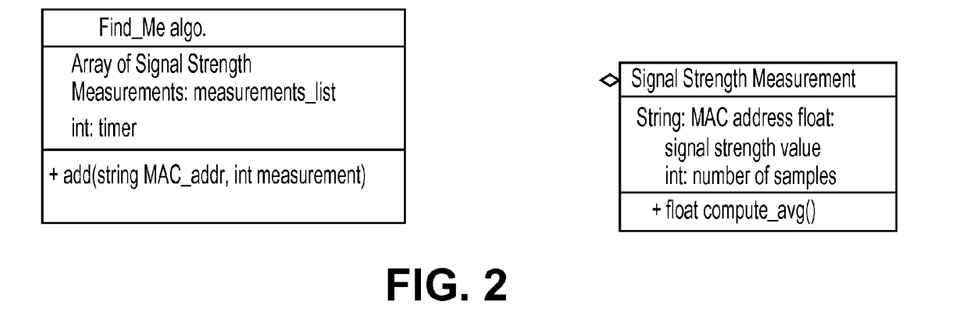
FIG. 2 illustrates one embodiment of a the data model for an example of the FIND_IT algorithm.

FIG. 2 illustrates one embodiment of a the data model for an example of the FIND_IT algorithm.

Figure 8:
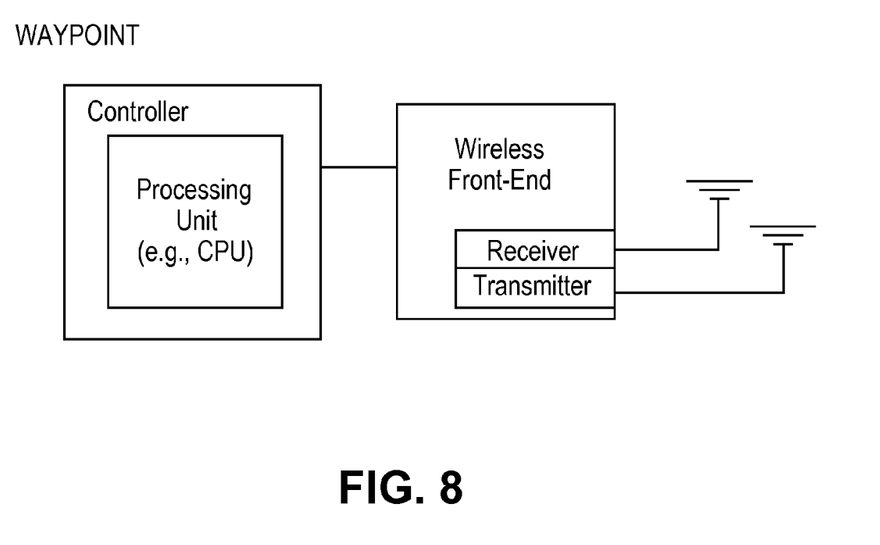
FIG. 8 is a block diagram of one embodiment of a waypoint.

FIG. 8 is a block diagram of one embodiment of a waypoint. Referring to FIG. 8, the processing unit performs the processing described herein, while the front end handles communication. In one embodiment, the waypoint comprises a receiver operable to sniff signals being wireless transmitted from a mobile device while monitoring the wireless network in response to a request from the server generated in response to a position request from the mobile device, a processing unit to process the received signals to determine signal strength information for the mobile device and a transmitter to send the signal strength information to the server via the access point or via a mesh network formed by the server and the waypoints.

Problems and their Solutions

One problem to be addressed is the lack of synchronism between entities. Because the entities (mobile devices, YPs, and APs) are part of a distributed system, they do not share a common or absolute time reference, and therefore one cannot rely on message timestamps. A second problem is that due to range and delay considerations, as well as not knowing exactly how many YPs are in its vicinity, the map server cannot know ahead of time how many GOTCHA messages it will receive in response to broadcasting a FIND_IT message.

One solution to both problems is straightforward: a timeout value is used. When the timeout wait expires, whatever radio layer data (which is a combination of the mobile device (M) address, obtained from the MAC layer, and the SS measurements, obtained from the physical link layer) has been collected is used to determine the mobile device location.

Finally, it is advantageous for the map server to have at least a partial system overview to facilitate the positioning process and simplify the algorithms and messages. Therefore, every YP must have a unique ID (e.g., its own MAC address), which is stored in the map server database. The map server contains all YP identifiers (IDs) and additional YP-related data (according to the YP algorithms)

An Example of a Map Server and its Algorithms

The map server comprises a number of elements that perform a number of operations. In one embodiment, these include the following:

signal strength map (e.g., a measurement table) used to locate mobile devices;

maps cache used to serve maps to its clients (mobile devices).

list of common mobile devices and their physical characteristics (device table). (If a mobile device is not in this list, a default type is used to provide an approximate location.); and list of the APs in the system (including an adjacency matrix).

In one embodiment, the signal strength map is composed of physical locations and their associated physical signal strength measurements. It is built during an a priori step by a mobile device using system calibration software (which in one implementation is invoked by the "record me" button on the mobile device). Locations are defined at least by their Cartesian coordinates in any chosen referential system.

The maps cache contains pictures of maps which are sent to mobile devices in response to MAP_ME requests. Several map server and GIS (geographical information system) software systems exist that can be used to supply maps to mobile devices.

When the MS receives a FIND_ME request from a mobile, the map server looks it up in the list of common mobile devices. If found, the map server normalizes the signal strength measurements reported by the waypoints for the mobile device according to the normalizing constants stored in the table.

Getting Signal Strength Measurements

---

Algorithm 2 FIND_IT burst on map server

Burst_delay ← BASE_TIMER/BURST_SIZE
timer ← BASE_TIMER
loop ← true
while loop do
    if timer%burst_delay = 0 and timer ≧ 0 then
        send(FIND_IT)
    end if
    if receive(GOTCHA) and timer + ADDITIONAL_TIMER ≧ 0 then
        extract(fm_id, y_id, ss)
        measurements_list[yp_id].add(ss)
    end if
if timer + ADDITIONAL_ TIMER = 0 then
        compute avg(measurements_ list)
        d← compute_location(measurements_list)
        store(d)
        clear(measurements_list)
        loop ← false
    end if
end while

---

Algorithm 2 above represents the way the map server gathers signal strength data from the YPs. To explain the algorithm, some of its data types and functions are defined below. FIG. 2 illustrates one embodiment of the data model for the FIND_IT algorithm.

In the algorithm, it is assumed that "timer" is a decrementing timer.

The measurements_list (a dedicated data type) is a list of key-value pairs where the keys are yp_ids (for example, a C++ unordered_map<string, pair<int, oat>>). Each element in the list is a pair of fields: number of signal strength samples used to compute the average ss value and the average signal strength value itself.

Algorithm 2 use three timer-related parameters: BASE_TIMER—the length of the burst; BURST_SIZE—the number of packets in each burst; and ADDITIONAL_TIMER—the amount of time to wait after the BASE_TIMER expires so as to receive as many GOTCHA messages as possible. This timer's optimal value is implementation-dependent, based on the transmission delays within the system.

The fm_id that is extracted from GOTCHA messages is the mobile device MAC address, which is used to match the GOTCHA message to its corresponding request.

In one embodiment, the map server runs several parallel instances of algorithm 2 This enables the map server to determine the locations of multiple mobile devices at the same time. One embodiment of this system handles all FIND_IT messages in one process, using for example, the C-language select( ) function. Another embodiment uses a separate thread for every FIND_IT request.

Algorithm 2 uses the following functions:
send(FIND_IT)—broadcasts a FIND_IT message.
receive(GOTCHA)—receives GOTCHA messages. For example, in a C-language implementation, this would typically be the recvfrom function with filtering based on port number and request field in the (GOTCHA message) packet.
extract—extracts values, such as the transmitter's YP ID and signal strength, from a GOTCHA message.
add—adds a measurement to the measurements list. (Although the location in the list is logically immaterial, it affects the algorithm's efficiency.) This function first checks whether the provided MAC address is already in the measurements list. If so, the new measurement value is merged with the existing information by using a weighted signal strength average calculation. The signal strength value and number of samples are also updated. If the MAC address is not in the measurements list, this function creates a new entry. (Note that when using map or derived data structures from C++ STL, this is a straightforward use of operator [ ].)
compute location—computes the mobile device location by comparing the signal strength measurements reported by GOTCHA messages to the reference points stored in the measurements list.
clear—deletes an entry from the measurements list.
store—stores a mobile device location until the mobile device requests it.
compute avg—computes average signal strength values for each YP for which the map server received SS values. Because SS values are typically in dBm, in one embodiment, they are converted to mW when calculating the average. The formula to compute an average value SS of N SS values (which are in dBm) is:

$$\overline{SS} = 10\log\left(\frac{1}{N}\sum_{i=1}^{N} 10^{\frac{ss_i}{10}}\right)$$

Receiving Partial Signal Strength Measurements

In response to each FIND_IT broadcast, the map server receives GOTCHA messages from YPs in the vicinity of the mobile device—that is from YPs that successfully captured data frames transmitted by the mobile device.

After receiving a number of GOTCHA messages, the map server completes the data: it lists all the registered YPs, and fills in their signal strength field values with the data received in the FIND_IT request. All other YPs are given a default value that is the lowest signal strength measurable by a $YP\text{Min}_{ss}$, minus 1 dBm:DEFAULT_VALUE←$\text{Min}_{ss}$−1.

After the map server has successfully determined the location of the mobile device, it will change the response to the mobile devices FIND_ME requests from TRY_AGAIN to SUCCESS. The SUCCESS message may contain either a map in the body of the response or a link to a map.

If the map server cannot determine the location of mobile device (for instance, because no GOTCHA's were received), the map server will respond with ERROR to the mobile device FIND_ME requests.

Positioning Algorithm

To reduce the solution space cluster (the number of potential locations of the mobile device), the reference points should be grouped by the BSSID value (the AP MAC address) that the YPs reported to the mobile device. Only those reference points whose BSSID match or are adjacent to the one included in the MAP_ME message are considered in the solution space.

In one embodiment, when the correct cluster (location subset based on location similarity) is selected, a k-nearest neighbor (KNN) search is performed on the remaining reference points to find the three nearest neighbors. Finally, the position is estimated by weighted trilateration of those three points.

Neighbor Search

In one embodiment, the neighbor search algorithm uses as input a signal strength map that associates location coordinates to SS measurements. Each locational coordinate consists of two continuous (floating point) variables (x, y) representing the horizontal position (Cartesian coordinates relative to the origin as configured during system setup) and a discrete variable (z) representing the floor level. A signal strength map record is defined as reference point L, and the reference points set is designated R. Each set R element is composed of its location (Pj) and a list of signal strength measurements from each YP, where $ss_{ji}$ is the signal strength of YP number i for reference point j.

When the map server receives a MAP_ME message, it extracts the signal strength values $ss_i'$ and selects the three closest reference points L in R.

The closest point is the one whose ss values vector is closest to the measurement sent by the phone in its MAP_ME request. Assuming there are N YPs and M reference points:

$$L = \left\{ Pj \Big/ \min_{1 \leq j \leq M}\left(\sqrt{\sum_{i=1}^{N}(ss_{ji} - ss_i')}\right) \right\}$$

In this algorithm, it is assumed that the distance between any given measurement and a reference point is the Euclidean distance between them. It is defined by:

$$d = \sqrt{\sum_{i=1}^{N}(ss_{ji} - ss_i')}$$

The Euclidean distance is bound to the N-dimensional space in which each component is the signal strength value of one YP.

Weighted Trilateration

The weighted trilateration algorithm is based on a weighted average of the three locations chosen by the neighbor search algorithm. That is, the solution location's coordinates x and y are calculated by using a weight inversely proportional to the neighbor search's three locations' distance d in signal strength space, as described by Brunato et al. [6]:

$$p = \frac{w_1 \cdot p_1 + w_2 \cdot p_2 + w_3 \cdot p_3}{w_1 + w_2 + w_3}$$

where p is the location computed by weighted trilateration; p1, p2 and p3 are the locations chosen by neighbor search; and w1, w2 and w3 are the weights of points p1, p2 and p3;

$$w_n = \frac{1}{d(SS_{pn}, SS) + \varepsilon} \text{ for } n = 1 \text{ to } 3.$$

Calibration

A discussion of calibration is included here because the map server stores all calibration-related data. However, the entire system is part of the calibration process: mobile devices transmit signals to be measured, APs transmit the data exchanged, and YPs measure signal strength.

To produce the signal strength map, calibration software is used on a mobile device. Because measurements vary depending on the mobile device hardware, calibration is required for each device family (e.g., as iPhones, HTCs, and so on). The calibration software first gathers measurements through the same protocol used by the location determination software: send a CALIBRATE message to the map server and receive an acknowledge message from the map server indicating successful calibration.

The map server algorithm is similar to the location algorithm with respect to the FIND_IT burst transmission and data gathering. The only difference is that the during the calibration process, the reference point coordinates are provided by the mobile device. The final step of the process is to insert reference points into the reference point database. Thus, during calibration, the mobile device specifies its location ("I'm at X,Y,Z now"), and the server collects YP SS readings, and enters the tuple X,Y,X and the SS readings into the reference point database.

There are two ways to input reference points coordinates:
1) manually—type coordinates or click a location on a displayed map.
2) automatically—using another way to determine the location. One way can be using the camera on the mobile device to calibrate, take a picture of the QR-code (quick response code such as, for example, a 2D barcode or similar camera readable tag) for physical locations (typically landmarks, but can be any point where positioning service is provided) contained in the signal strength map. The QR-code encodes its own location. The device decodes the captured QR-code image to extract the coordinates. Another way consists of determining the location via GPS (where a GPS fix can be obtained) and by inferring location via the accelerometer and compass on the device (where the GPS signal is not available).

In one embodiment, the mobile device includes continuous calibration capabilities. In such a case, the device can determine its location by other means that do not require user input (e.g., obtain absolute location via GPS, then relative location via a built-in accelerometer and compass) and uses that information to provide reference point coordinates to the server. The location obtained by the phone itself using this other means is then associated by the MS with the signal strength readings provided by the waypoints. In this way, the database of calibration points can be populated by walking the phone through the areas where location services are to be provided.

In one embodiment, each different mobile device may transmit at different signal strengths. Therefore, in one embodiment, a determination is made as to which mobile phone (device) is requesting its location to be determined and based on the identification of the phone, the signal strength measurements obtained corresponding to transmissions by that phone may be normalized to facilitate the location determination process. In one embodiment, the phone runs a browser application and sends the browser ID, which is used by the map server to indicate which model phone is in use.

In one embodiment, dedicated calibration hardware can be used for calibration of the mobile phone (device). Such dedicated hardware may include a tray into which the mobile phone may be placed that can measure signal strength of the mobile phone from multiple locations (e.g., 4) on the tray. In such a case, the tray would operate as four waypoints on different sides of the phone. By pressing a button, the different measurements may be taken by the hardware and sent to the map server. Because the map server knows the MAC address, the map server is able to store the signal strengths measurements as reference data for use subsequently in the location determination process.

An Example of an Embodiment

One embodiment of the map server embeds a PostgreSQL database containing the reference points data (signal strength map), the list of common types of mobile devices (the device families), and XML files that describe the APs' BSSID and their neighbors (to build the adjacency matrix).

Figure 3:
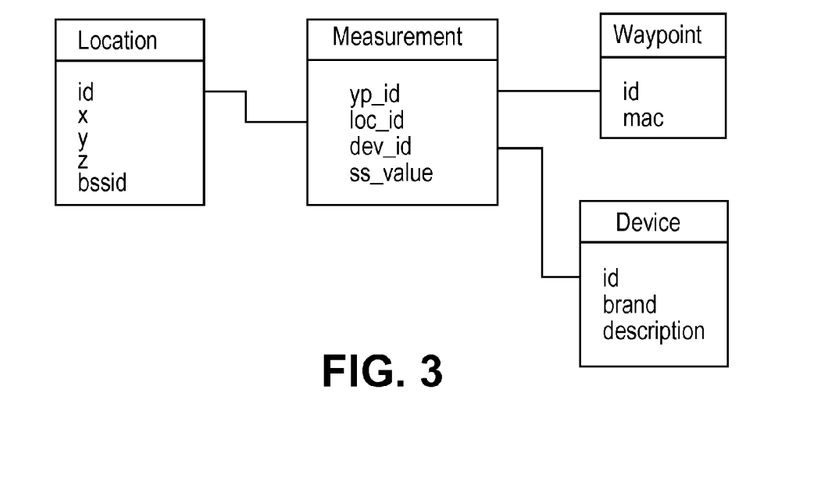
FIG. 3 shows one embodiment of the database structure contained in the map server.

FIG. 3 shows one embodiment of the database structure contained in the map server. The measurement table is the core of this database and contains signal strength measurement values for the system's YPs, locations, and mobile devices. Devices are linked to measurements so that there will be reference measurements for each device family. The Location and Waypoint tables are used because locations and YPs are part of a reference measurement definition (signal strength measurement for a given location).

TABLE 1

| Location table definition | | | |
|---|---|---|---|
| id | integer | not null | primary key |
| x | double | not null | |
| y | double | not null | |
| z | integer | not null | |
| bssid | varchar(17) | not null | |

Table 1 above describes the Location table. The ID field is an integer value, and is the table's primary key. Fields x and y are floating point values identifying the locational coordinate. Field z, an integer value, is the location—a floor number and/or a map identificator. (Note that this field is used to link a location and a floor picture.) Lastly, the bssid field binds the location to an access point, enabling reference point clustering (filtering locations by a mobile device (M) BSSID value). Locations are indexed on id and bssid (two distinct indexes). Table 1 values cannot be null.

TABLE 2

Waypoint table definition

| id | integer | not null | primary key |
|---|---|---|---|
| mac | varchar(17) | not null | |

Table 2 describes the Waypoint table. The ID field is an integer value, and is the table's primary key. The mac field is a 17-character value that specifies the YP's MAC address. Both table fields are indexed (to ensure quick database searches). Table 2 values cannot be null.

TABLE 3

Device table definition

| id | integer | not null | primary key |
|---|---|---|---|
| brand | varchar(12) | null | |
| description | varchar(32) | not null | |

Table 3 describes the Device table. The id field is an integer value, and is the table's primary key. The brand field contains the device vendor (e.g., Apple, HTC, etc.), and the description field is the device model description as sent by mobile devices in MAP_ME and CALIBRATE messages. The id and description fields are indexed. Table 3 values cannot be null.

TABLE 4

Measurement table definition

| yp_id | integer | not null | foreign key |
|---|---|---|---|
| loc_id | integer | not null | foreign key |
| dev_id | integer | not null | foreign key |
| ss_value | double | not null | |

Table 4 describes the Measurement table's data formats. The yp_id, loc_id, and dev_id fields are indexed values that cannot be null. The ss_value field is the signal strength value, represented as a double, and cannot be null.

An example SQL query:

```
SELECT id, x, y, z, bssid, SQRT(SUM(diff_ss_value * diff_ss_value))\
FROM ( \
(SELECT loc_id, (ss_value − my_ss[0]) AS diff_ss_value \
FROM measurement INNER JOIN location ON
location.id=measurement.loc_id \
WHERE location.bssid IN (my_bssid[0], ..., my_bssid[M−1]) \
AND yp_id=my_yp[0] AND dev_id=my_dev) \
UNION \
...
UNION \
(SELECT loc_id, (ss_value − my_ss[0]) AS diff_ss_value \
FROM measurement INNER JOIN location ON
location.id=measurement.loc_id \
WHERE location.bssid IN (my_bssid[0], ..., my_bssid[M−1]) \
AND yp_id=my_yp[0] AND dev_id=my_dev) \
) AS local_distances INNER JOIN location on
location.id=local_distances.loc_id \
GROUP BY id, x, y, z, bssid \
ORDER BY Distance \
LIMIT k;
```

In this example, all my_X data come from MAP_ME message sent by a mobile device to the map server. Some of the data are tables, such as my bssid (which contains M values based on which BSSID the mobile client is connected to), my_ss (signal strength values), and my_yp (YPs IDs obtained from the measurements sent by a mobile device. In one embodiment, there are elements in both tables. The k value represents the number of locations selected for weighted trilateration described above.

MESSAGES DEFINITION

One embodiment of the messages used by the FIND_ME protocol are described below. The message sequence for a complete FIND_ME interaction starts when a mobile device issues a FIND_ME request and ends when the map server returns a computed location. Messages are defined by their 4th layer type (UDP or TCP) and their size.
Message Sequence Chart An example message sequence is presented in FIG. 4. In this example, the system comprises three YPs (yp1, yp2, yp3), a mobile device (p) and a map server.
Mobile Device Messages
FIND_ME Message Referring to FIG. 4, a message sequence begins when p sends a FIND_ME message to the map server, which, in one embodiment, is a simple HTTP request.

Figure 4:
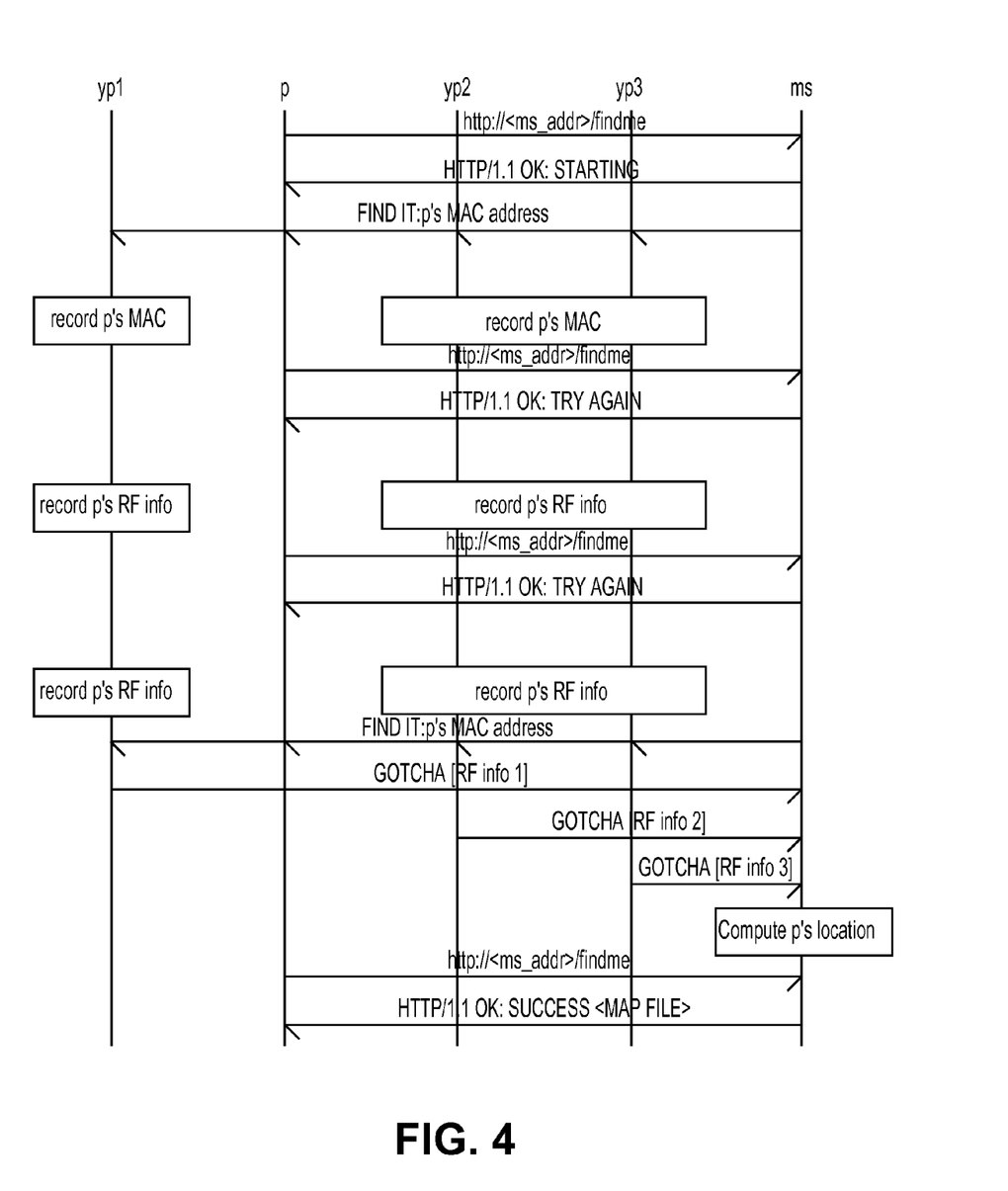
FIG. 4 illustrates an example message sequence.

After map server receives enough GOTCHA messages to determine the location of the phone, it sends a MAP_ME message to the AP. In one embodiment, this message is a simple HTTP request that includes two parameters: the request id (which was provided by the map server) and the mobile device model information (as a serialized string).
CALIBRATE Message Before the depicted message sequence can occur, p sends a CALIBRATE message, which, in one embodiment, is a variable size TCP packet.

Figure 5:
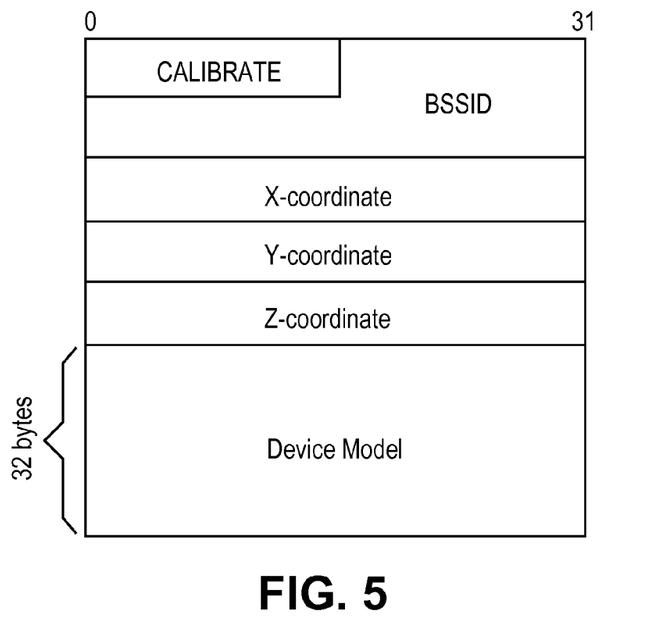
FIG. 5 is an example of a CALIBRATE message structure.
Figure 6:
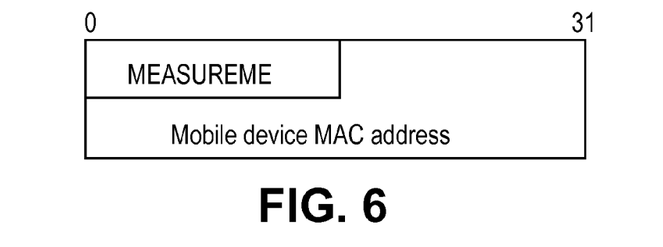
FIG. 6 is an example of a FIND_IT message structure.
Figure 7:
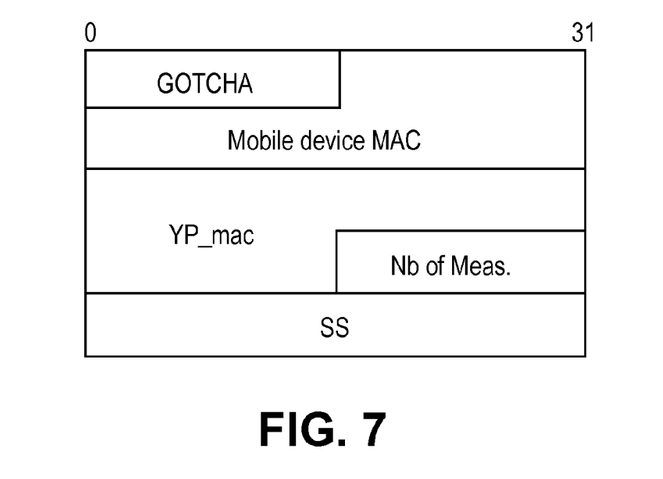
FIG. 7 is an example of one embodiment of a GOTCHA message structure.

As shown in FIG. 5, one embodiment of CALIBRATE message contains 7+(2×N) fields: 1) request code—CALIBRATE (0x5); 2) current BSSID—mobile device current BSSID on 6 bytes (MAC address), padded with 2 bytes to 8 bytes; 3) plan coordinates—x and y coordinates of the reference point, each on 4-bytes float; 4) floor coordinate—z coordinate on a 4-bytes long int; and 5) device model—mobile device model string on 32 bytes
Map Server Messages
FIND_IT Message The FIND_IT message is a fixed-size UDP packet. As shown in FIG. 6, one embodiment of a FIND_IT message contains the following fields: 1) request code—MEASUREME (0x1); and 2) mobile device (M)—mobile device ID (e.g., its MAC address).
Waypoints Messages
GOTCHA Message When a YP receives a FIND ME message, it responds by sending a GOTCHA message to the mobile device. The message contains the signal strength value of messages sent from the mobile device to the AP. To identify the signal strength source, the GOTCHA message also contains the YP MAC address. In one embodiment, the GOTCHA message is an HTTP request but it could be a message As shown in FIG. 7, one embodiment of the GOTCHA message contains the following fields: 1) request code: GOTCHA (0x3); 2) mobile device ID—its MAC address on 6 bytes; 3) YP ID—YP MAC address on 6 bytes; 4) Nb od Meas.—number of measurements averaged in the current message; and 5) measurement value—signal strength value on 4 bytes float.

Other Considerations

Power Consumption

Given that YPs are associated to an access point, they can operate in standard IEEE Power Save (PS) mode. YPs remain in PS mode until they receive a FIND_IT request from a mobile device (relayed by an AP). At that time, the YP transitions from PS mode to Active state so that it can collect RF information from the mobile device. When RF information collection is finished, YPs return to the Power Save mode. This feature is particularly valuable for battery operated YPs, where conserving energy is vital to increasing battery life.

Waypoints Colocated with Access Points

YPs can be implemented as standalone wireless nodes or virtual nodes colocated with an Access Point. In the latter case, in one embodiment, the YP protocol is implemented as a separate process running on the same host as the AP. The YP and AP can use separate radios, one CPU, or a shared radio and CPU.

In one embodiment, the mobile device wirelessly transmits in the network on one of multiple possible channels. During the process, the waypoints are able to switch through all the channels to determine what channel the mobile device is using during the location identification process.

Embodiments of the system described are based on one or more of a number of innovative principles. First, this system is collaborative. Its aim is to provide additional services to its users through their mobile devices, based on their location, at their request. Second, this system relies on a hybrid sniffer/client station named YP, which is able to communicate with other devices on layer 3, and concurrently capture radio information on layer 2. Third, it is based on an asymmetric protocol in which regular layer 3-only stations interact with layer 2 and 3 hybrid devices. Fourth, standard IEEE 802.11 traffic is used, with no adaptations necessary for it, the wireless clients, or the access points. Fifth, the simplicity of the mobile device side of the FIND_ME protocol, which does not require low-level RF signal strength information, allows it to be implemented inside any Internet browser. Sixth, in the case where an 802.11 based mesh network is used, waypoints can be deployed without any additional provisioning or special configuration.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for a server to determine a location of a mobile device in a wireless network, the method comprising:
   receiving a first request from the mobile device in the wireless network;
   wirelessly transmitting one or more positioning requests in response to the first request;
   receiving signal strength information from one or more receivers in the wireless network sent in response to the one or more positioning requests, wherein received signal strength information is from the one or more receivers sniffing wireless channels in the wireless network, wherein at least one receiver sniffs multiple channels;
   determining a location of the mobile device based on received signal strength information by comparing the received signal strength information with signal strength information of reference locations; and
   sending location information to the mobile device, the location information indicative of the location of the mobile device.

2. The method defined in claim 1 wherein the information sent to the mobile device comprises map data that provides a graphical indication of mobile device location when displayed.

3. The method defined in claim 1 wherein receivers of the one or more receivers comprise waypoints.

4. The method defined in claim 1 wherein the mobile device is a Wi-Fi device.

5. The method defined in claim 1 wherein signal strength information of the reference points is based on mobile device transmissions from known locations identified by GPS coordinates, or by location inferences made using the phone's accelerometer and magnetic compass and the last known GPS location.

6. The method defined in claim 1 wherein signal strength information of reference points are based on mobile device transmissions from known locations identified by the mobile device scanning in machine readable information at the known locations.

7. The method defined in claim 1 wherein the first request includes the MAC address of the mobile device.

8. The method defined in claim 7 wherein the first request includes information indicating a channel the mobile device is using for transmission to the server.

9. The method defined in claim 7 wherein the first request is received communication over the HTTP protocol.

10. The method defined in claim 1 wherein each of the one or more receivers sends the signal strength information via a HTTP post operation.

11. The method defined in claim 1 wherein the first request and the positioning requests are layer 3 requests.

12. A wireless network comprising:
    a server operable to generate one or more position requests in response to a first request from a mobile device;
    at least one access point communicably coupled to the server;
    a plurality of receivers at fixed locations, operating simultaneously as a wireless station in the wireless network and as a sniffer in the wireless network, each of the plurality of fixed receivers being communicably coupled to the at least one access point to send signal strength information for the mobile device in response to the one or more position requests from the server, by monitoring in the wireless network communications of the mobile device in response to the first request from the server,
    wherein the server is operable to determine the location of the mobile device based on a comparison between signal strength information received from one or more receivers of the plurality of receivers and signal strength information from reference points within the wireless network.

13. The wireless network defined in claim 12 wherein the fixed receivers communicate with the server at layer 3 while capturing layer 2 frames of wireless communications from the mobile device.

14. The wireless network defined in claim 12 wherein the server is operable to send location information to the mobile device, the location information indicative of the location of the mobile device.

15. The wireless network defined in claim 14 wherein the information sent to the mobile device comprises map data that provides a graphical indication of mobile device location when displayed.

16. The wireless network defined in claim 12 wherein receivers of the plurality of receivers comprise waypoints.

17. The wireless network defined in claim 12 wherein the mobile device is a Wi-Fi device.

18. The wireless network defined in claim 12 wherein signal strength information of the reference points is based on mobile device transmissions from known locations identified by GPS coordinates.

19. The wireless network defined in claim 12 wherein signal strength information of reference points is based on mobile device transmissions from known locations identified by the mobile device scanning in machine readable information at the known locations.

20. The wireless network defined in claim 12 wherein the first request includes one or more of a MAC address of the mobile device and information indicating a channel the mobile device is using for transmission to the server.

21. The wireless network defined in claim 20 wherein the first request is received communication over the HTTP protocol.

22. The wireless network defined in claim 12 wherein at least one of the plurality of receivers sniffs multiple channels to determine a channel being used by the mobile device.

23. The wireless network defined in claim 12 wherein each of the one or more receivers sends the signal strength information via a HTTP post operation.

24. The wireless network defined in claim 12 wherein the first request and the positioning requests are layer 3 requests.

25. A waypoint for use in a wireless network having at least one access point and a server communicably coupled to the server, the waypoint comprising:
   a receiver operable to sniff signals being wireless transmitted from a mobile device while monitoring the wireless network in response to a request from the server generated in response to a position request from the mobile device, wherein the receiver sniffs multiple channels to determine a channel being used by the mobile device;
   a processing unit to process the received signals to determine signal strength information for the mobile device; and
   a transmitter to send the signal strength information to the server via the access point or via a mesh network formed by the server and the waypoints.

26. The waypoint defined in claim 25 wherein the transmitter sends the information to the server at layer 3 while capturing layer 2 frames of wireless communications from the mobile device.

* * * * *